United States Patent [19]

Prohaska et al.

[11] Patent Number: 4,726,041
[45] Date of Patent: Feb. 16, 1988

[54] DIGITAL FILTER SWITCH FOR DATA RECEIVER

[75] Inventors: Bernd Prohaska; Hans-Dieter Schwartz; Rudolf Winkelmann, all of Munich; Gerhard Zettl, Kirchheim, all of Fed. Rep. of Germany

[73] Assignee: Siemens Aktiengesellschaft, Berlin and Munich, Fed. Rep. of Germany

[21] Appl. No.: 881,809

[22] Filed: Jul. 3, 1986

[30] Foreign Application Priority Data

Jul. 3, 1985 [DE] Fed. Rep. of Germany ....... 3523841

[51] Int. Cl.$^4$ ............................................. H03D 3/00
[52] U.S. Cl. ........................................ 375/91; 375/80; 329/110
[58] Field of Search ................. 375/80, 82, 88, 90, 375/91; 329/104, 107, 110, 126, 140; 307/525; 328/133, 138; 364/729

[56] References Cited

U.S. PATENT DOCUMENTS

| | | | |
|---|---|---|---|
| 3,689,844 | 9/1972 | Buzzard et al. | 375/82 |
| 3,803,501 | 4/1974 | Jones, Jr. | 329/104 |
| 3,858,117 | 12/1974 | Denny | 375/91 |
| 3,921,075 | 11/1975 | Denny | 375/91 |
| 4,506,228 | 3/1985 | Kammeyer | 329/107 |
| 4,543,532 | 9/1985 | Kässer | 329/107 |
| 4,583,048 | 4/1986 | Gumacos et al. | 375/90 |

OTHER PUBLICATIONS

NTZ 37/7 (1984) pp. 414–419, "Digitaltechnik", W. Demmer, P. Draheim, R. Gutsmann, Digitale Signalverarbeitung von FM-modulierten Signalen.

IEEE Transactions Communications Com-29, 1981, pp. 1061–1065, "Approximate FM Demodulation Using Zero Crossings", R. G. Wiley.

Primary Examiner—Benedict V. Safourek
Attorney, Agent, or Firm—Hill, Van Santen, Steadman & Simpson

[57] ABSTRACT

A digital filter switch for use with a data receiver incorporates first and second squaring units connected to the outputs of first and second band-pass filters tuned to the separation and character frequencies in a signal transmission. The outputs of the squaring units are interconnected via an adder to the input of a low-pass filter, which produces the output data signal.

3 Claims, 11 Drawing Figures (n=1,2,3...)

DIGITAL FILTER SWITCH FOR DATA RECEIVER

BACKGROUND

The present invention relates to a digital filter switch for a data receiver, and more particularly to a switch for a data receiver having two paths following an analog-to-digital converter each containing a band-pass filter.

The periodical "NTZ", Vol. 36 (1983), No. 12, pp. 806-808 describes a method for digital FM-demodulation under the title "Ein digitaler Demodulator fur aequidistant abgetastete FM-Signale". In addition, the periodical "IEEE Trans. Communications COM-29" (1981), No. 7, p. 1061 and the periodical "NTZ", Vol. 37 (1984), No. 7, p. 414 both describe digital detectors which may be used for detecting zero axis crossings in connection with a data receiver. However, these circuits, when constructed in practical form, lead to relatively great circuit complexity. It is thereby desirable to construct a digital filter switch which is more simply and economically realized.

BRIEF DESCRIPTION OF THE INVENTION

A principal object of the present invention is to provide a data receiver using a digital filter switch in which excess circuit complexity is avoided as much as possible.

This object is achieved in accordance with the present invention by the use of squaring circuits in each band-pass filter path following an analog-to-digital converter.

In one desirable application, consider a mobile telephone employing FFSK (fast frequency shift keying) as the modulation method, with a data rate of 1200 Baud. When a frequency $f_z$ is used for a logical "0", and a frequency $f_T$ of 1200 Hz is used for a logical "1", then several requirements are necessary in order to minimize the error rate in the data reception.

The linear phase quality, or the constant envelope delay, of the filters used must be specified throughout the pass band, including the limits of the pass band, since different transit times would lead to isochronic distortions. Therefore it is necessary to employ a short response time for the filters and, thus, low step distortions and fast synchronizations must be provided for. It is also necessary to provide a large vertical eye aperture in order to give relatively great insensitivity to AM (amplitude modulation) disturbances and noise, and a relatively great horizontal eye aperture is desirable, with precise zero axis crossings, since the clock pulses of the discriminator following the data receiver is synchronized with the zero axis crossings. Finally, a symmetrical eye should also be provided for with respect to the zero axis, in order to avoid the need for level-dependent discriminator thresholds.

When the signal processing is performed by a data processor or the like, it is also desirable to have an arrangement in which the data processor has relatively few instructions between consecutive sampling times, together with a low memory requirement, including a RAM for storage of data and a ROM for storing coefficients and programs.

BRIEF DESCRIPTION OF THE DRAWINGS

Reference will now be made to the accompanying drawing in which.

DESCRIPTION OF THE PREFERRED EMBODIMENT

Figure 1:
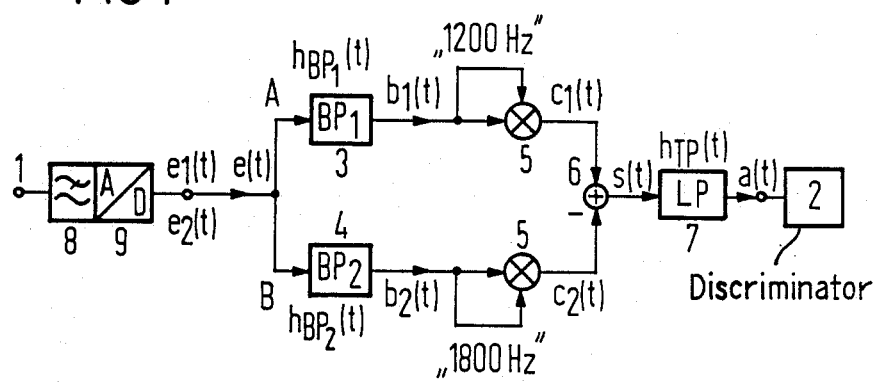
FIG. 1 is a schematic diagram of a demodulator incorporating a digital filter switch incorporating an illustrative embodiment of the present invention having an analog-to-digital converter and a discriminator.

Referring now to FIG. 1, a signal supplied to an input terminal 1 is supplied to an anti-aliasing low-pass filter 8 which is followed by an analog-to-digital converter 9. The function of the low-pass filter 8 is to prevent periodic attenuation variations.

The analog-to-digital converter 9 produces output signals in digital form as $e_1(t)$ and $e_2(t)$. A first path A, for example, a 1200 Hz path, incorporates a band-pass filter 3, whereas a second B path for 1800 Hz incorporates a band-pass filter 4. The responses of the band-pass filters 3 and 4 are respectively $h_{BP1}(t)$ and $h_{BP2}(t)$, as indicated in FIG. 1. Signals $b_1(t)$ and $b_2(t)$ appear at the outputs of the band-pass filters 3 and 4. These signal are supplied to squaring devices 5 which follow each of the band-pass filters 3 and 4 which supply respectively signals $c_1(t)$ and $c_2(t)$ as outputs, which represent the product of the signals $b_1(t)$ and $b_1(t)$, and the product of the signals $b_2(t)$ and $b_2(t)$, respectively. These two outputs are supplied to inputs of an adder unit 6, which performs a subtraction by inverting the sign of one of the operands before adding. The adder produces a difference output signal $s(t)$ which is connected to the input of a low-pass filter 7 (TP) which has a response indicated in FIG. 1 as $h_{TP}(t)$. It produces an output signal $a(t)$ which is applied to the input of a discriminator 2 which serves to synchronize the discriminator clock via the zero axis crossings of the signal $a(t)$ and produces the output messages. The detailed structure of the discriminator is not described because it is not necessary for an understanding of the present invention.

The band-pass filter 3 is tuned to the separating frequency $f_1$ of 1200 Hz, whereas the band-pass filter 4 is tuned to the character frequency $f_2$ of 1800 Hz. The function of the low-pass filter 7 (TP) is to attenuate harmonics which may be present in the difference signal produced at the output of the adder unit 6.

When amplitude-modulated disturbances are present, they are superimposed on the frequency-modulated signal and cannot be suppressed by an amplitude limiter because the signals are in digital form. A limitation of the digital signal would denote an information loss and, thus, an uncertainty in the recovery of the discriminator clock. On the other hand, the sampling system has a relatively low sampling frequency, for example, 10.8 KHz, and a trimming of the amplitude would generate a composite signal having high-frequency components having amplitudes proportional to 1/f, which would fold down into the useful band and create aliasing. Rectifiers are therefore not used for the conversion into the base band but instead the squarers 5 are employed. The operation of the squaring units 5 results in the doubling of the frequency of each component of the input signal. In addition, the transfer functions of the two band-pass filters 3 and 4, together with the squarers 5, can be tuned such that only a single low-pass filter 7 is required, for shaping the signal s(t) and suppressing the higher frequency components.

The low-pass filter 7 is constructed to cooperate with the two band-pass filters 3 and 4, so as to produce output pulses of opposite sign in response to input signals having the character frequency $f_1$ or the separating frequency $f_2$. The two pulses produced at the output of the low-pass filter TP, one of each sign, both have a time-duration approximately equal to the length of a single character, with zero axis crossings (for discrimination times) spaced to define a character time slot.

The structure of the digital filters is arbitrary and can be in accordance with previously known designs. Filters which are referred to as transversal filters form a special subspecies of digital filters, a third degree transversal filter illustrated in FIG. 2 being an example thereof. Preferably, the band-pass filters 3 and 4 and the low-pass filter 7 are constructed so as to cooperate with each other to produce the desired output pulses of the output of the low-pass filter 7.

Figure 2:
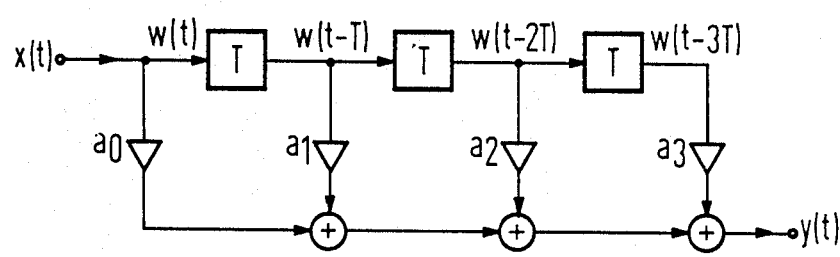
FIG. 2 is a functional block diagram of a transversal third degree filter having three delay elements.

The filter illustrated in FIG. 2 is a transversal or non-recursive filter. It incorporates three time-delay elements, each having the delay time T, which are connected in chained relationship. A signal x(t) is supplied to the input of the first time-delay element T which corresponds to the signal w(t). At the output of each of the time-delay units T, the signals w(t−T), w(t−2T) and w(t−3T) are produced. Each of these signals is supplied to the input of a multiplier $a_0$, $a_1$, $a_2$ and $a_3$, the outputs of which are connected to the operand inputs of a plurality of serially connected adders. The output of the last adder produces the output signal y(t). When the coefficients of a filter like that of FIG. 2 meet certain symmetry requirements, then the requirement for a linear phase progression is satisfied.

Both band-pass filters 3 and 4 are adapted to each other so that the frequency spectra of the output of the adder 6 has the range from 0 Hz through $2f_N$ (1200 Hz is twice the Nyquist frequency), for an input signals having a sinusoidal separating or space frequency $f_1$ and a character or mark frequency $f_2$, for example, 1200 Hz and 1800 Hz, respectively, for the duration of one character length. The low-pass filter 7 then suppresses the high-frequency components above 1.2 kHz, and shapes the frequency spectrum symmetrically into a broad Nyquist spectrum with respect to the Nyquist frequency of:

$$f_N = 600 \text{ Hz.}$$

The Nyquist frequency, as known, corresponds to the fundamental frequency of a 1:1 pulse train, with a pulse duration of half the Baud rate. The time function associated with a Nyquist spectrum, like a sine x/x function, has zero axis crossings at all preceding and following discrimination times, i.e., the division between successive character time slots. In the present case, no linear superimposition of the individual signals takes place as a result of operation of the squarers, but instead it has been found that the pulse cross-talk, for the case of an input sinusoidal pulse train, remains negligibly small due to the favorable transient behavior.

Figure 3A:
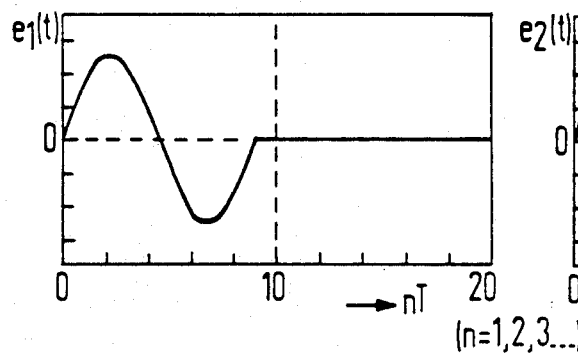
FIGS. 3a and 3b are waveforms illustrating cycles of operation of the separating frequency and the character frequency $f_1$ and $f_2$.
Figure 3B:
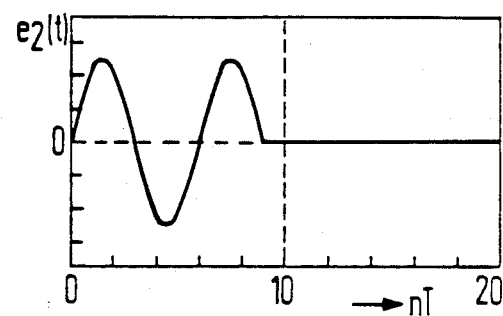
Figure 4A:
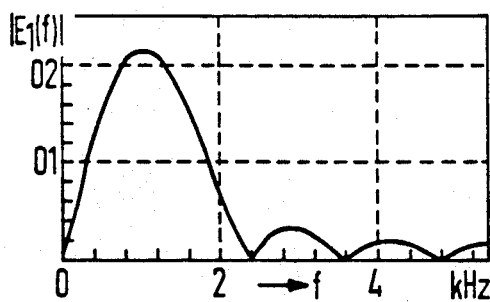
FIGS. 4a and 4b are two waveforms illustrating the pass bands of the band-pass filters of FIG. 1.
Figure 4B:
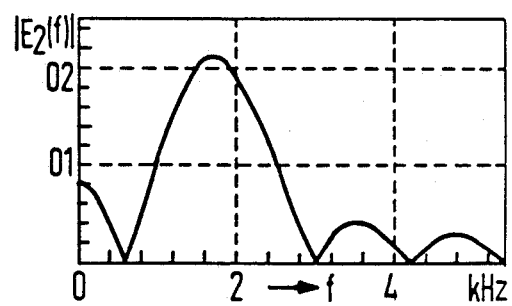

The following considerations are for the input signals of FIGS. 3a and 3b, and the pass bands of FIGS. 4a and 4b. Let the two input signals $e_1(t)$ and $e_2(t)$ be represented by:

$$e_1(t) = \text{rect}(t/t_s) \cdot \sin(2\pi \cdot f_1 t)$$
$$e_2(t) = \text{rect}(t/t_s) \cdot \sin(2\pi \cdot f_2 t) \quad (1)$$

with:
$f_1 = 1200$ Hz Separating frequency
$f_2 = 1800$ Hz Character frequency
$t_s = 1/1200$ Bd Step length
Their spectra $|\underline{E}_1(f)|$ and $|\underline{E}_2(f)|$, according to FIGS. 4a and 4b, are:

$$\underline{E}_1(f) = j \cdot \text{si}(\pi f t_s) * [\delta(f - f_1) - \delta(f - f_1)] \cdot e^{-j\pi f t_s}$$
$$\underline{E}_2(f) = \text{si}(\pi f t_s) * [\delta(f - f_2) + \delta(f - f_2)] \cdot e^{-j\pi f t_s} \quad (2)$$

(with * representing the convolution operator),
The spectrum following the adder 6 (FIG. 1) is:

$$\underline{S}(f) = \underline{C}_1(f) - \underline{C}_2(f) \text{ with:} \quad (3)$$
$$\underline{C}_\gamma(f) = \underline{B}_\gamma(f) * \underline{B}_\gamma(f) = [\underline{H}_{BP\gamma}(f) \cdot \underline{E}_\gamma(f)] * [\underline{H}_{BP\gamma}(f) \cdot \underline{E}_\gamma(f)]$$

for $\gamma = 1$ and $\gamma = 2$ at the separating and, respectively, at the character frequency.

In the example of FIG. 1, the low-pass filter 7 suppresses high-frequency components of the spectrum above about 1.2 kHz. Spectral equality is required only in the region up to about 1.2 kHz.

The convolution operations necessary for the calculation of S(f), indicated by equations (2) and (3) above, are produced only at a relatively few different frequencies. When the spectra of equations (2) are considered then a frequency grid $\Delta f$ of 300 Hz is sufficient. Folding then takes place only at the lower frequency points of 0 Hz, 300 Hz, 600 Hz and 900 Hz, and only nine spectral components (300 Hz, 600 Hz, . . . 2700 Hz) of B(f) need to be taken into consideration in equation (3). Frequency components of the input signal below 300 Hz are suppressed by the band-pass filters 3 and 4 and those above 2700 Hz can be neglected because of the pass band of the pass-band filters.

When input signals are provided in accordance with the functions $e_1(t)$ and $e_2(t)$, in accordance with FIGS. 3a and 3b, then the band-pass filters 3 and 4 are designed such that the frequency components of the spectra $S_1(f)$ and $S_2(f)$ at the output of the adder 6 become identical in amplitude. Alternatively, it is possible to design the circuit such that a "minimum energy in the other path" is satisfied. Thus, for a character, the separating path has minimum energy, and vice versa.

Given an input signal with $e_1(t)$ or $e_2(t)$, as much energy as possible should be transmitted to the useful channel, but as little energy as possible should be transmitted through the other channel. In other words, the target functions for the optimization provide:

$$N_1 = \left| \frac{\underline{C}_{2\mu}(f)}{\underline{C}_{1\mu}(f)} \right| \cdot K_1 \stackrel{!}{=} 0 \qquad N_2 = \left| \frac{\underline{C}_{1\mu}(f)}{\underline{C}_{2\mu}(f)} \right| \cdot K_2 \stackrel{!}{=} 0 \quad (4)$$

with:

$\mu = 1, 2$ Excitation index for the separating frequency or character frequency
$N_1$ Noise component in the 1200 Hz path
$N_2$ Noise component in the 1800 Hz path
$K_1, K_2$ Weighting factors A relatively large Nyquist component can also be achieved given an alternating sequence 1:1. When this is supplied to the input 1, the Nyquist component (with $f_N = 600$ Hz) of S(f) at the output of the adder 6 should be as great as possible, in comparison to the null component of S(f). Accordingly, the eye diagram becomes advantageously symmetrical relative to the zero line so that there is little or no "zero line offset" in dependence on the signal level. Otherwise a signal-level-dependent follow-up of the discriminator threshold would be required.

Figure 5:
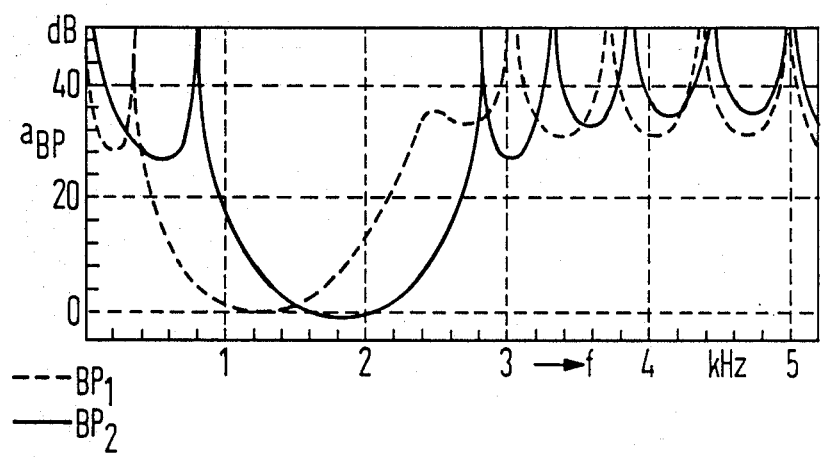
FIG. 5 illustrates attenuation characteristic of the band-pass filters.
Figure 6:
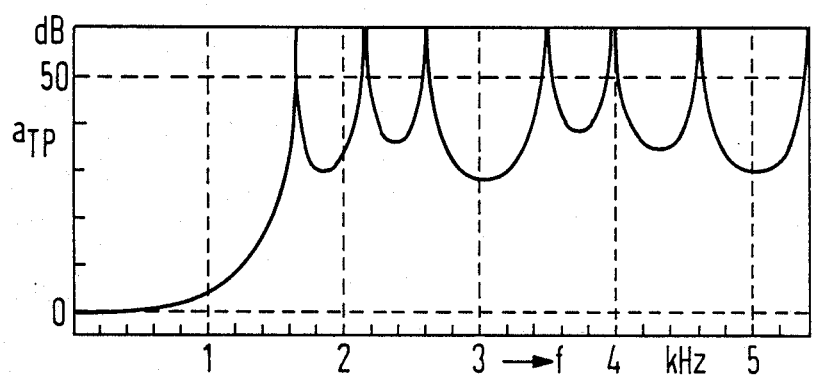
FIG. 6 illustrates the attenuation characteristic of a low-pass filter.

It is also desirable to have the discriminator characteristic symmetrical and linear with respect to the center frequency $f_N = 1.5$ kHz, and with equal excursion for continuous tone excitation of the separating frequency or the character frequency (1200 Hz and 1800 Hz respectively). This requires:

$$\text{DISK} = \left\{ \left[ \frac{1}{|C_1(f)|^2} - \frac{1}{|C_2(f)|^2} \right]_{|f=f_1} - \left[ \frac{1}{|C_1(f)|^2} - \frac{1}{|C_2(f)|^2} \right]_{|f=f_2} \right\} \cdot K \stackrel{!}{=} 0 \quad (5)$$

with
$f_1 = 1200$ Hz Separating frequency
$f_2 = 1800$ Hz Character frequency
K Weighting factor FIG. 5 shows the attenuation characteristic $a_{TP}$ of the band-pass filters 3 and 4. The characteristic of the filter 3 is shown with broken lines, and that of the filter 4 shown with solid lines. FIG. 6 shows the attenuation $a_{TP}$ of the low-pass filter 7. As may deduced from the shape of the curves, these filters have a higher degree than third degree filters shown in FIG. 2, in order to illustrate the operation with greater clarity. In the exemplary embodiment, the band-pass filters 3 and 4 are defined such that the attenuation reachs a minimum with the band-pass filter 3 at the frequency 1200 Hz, and reachs the minimum for the band-pass filter 4 at the frequency of 1800 Hz. The characteristic of the low-pass filter 7 is correspondingly optimized.

In order to avoid pulse cross talk, the low-pass filter 7 shapes the spectrum S(f) into a Nyquist spectrum A(f) having zero axis crossings evenly spaced at consecutive discrimination times, with respect to the Nyquist frequency $f_N = 600$ Hz. Since there is a rapid decay of any pre-shoot or over-shoot in the waveforms of the output pulses (FIGS. 7a and 7b), the conventional "roll-off" factor r should be close to 1. Thus, the spectrum S(f) is shaped into a Nyquist spectrum in as broad as possible a frequency range, up to a maximum of 2 $f_N$.

The low-pass filter 7 is designed to suppress high-frequency components of S(f) which result from the squaring. These high-frequency components appear particularly clearly in the region of twice the separating and character frequency, since the square of a sinusoidal input signal contains a signal at twice the input signal:

$$\sin^2(\omega t) = \frac{1}{2} - \frac{1}{2}\cos(2\omega t).$$

The low-pass filter 7 is also designed so as to have an attenuation of zero at 0 Hz.

Figure 7A:
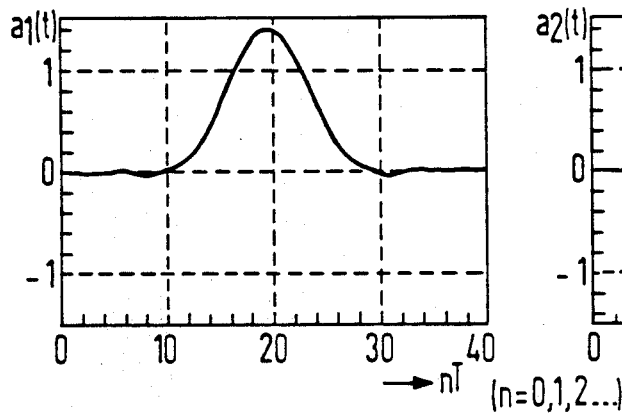
FIG. 7a and 7b illustrate waveforms of output pulses produced in response to the input signals of FIGS. 3a and 3b.
Figure 7B:
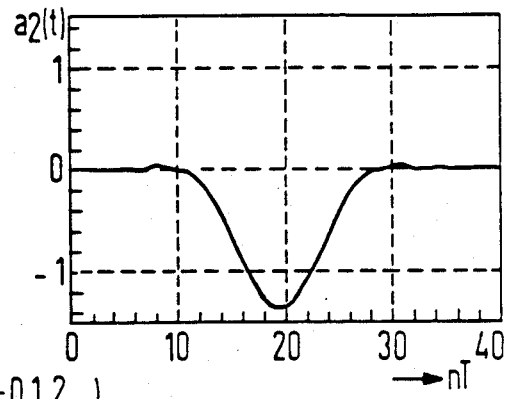

FIGS. 7a and 7b show the output of the demodulator given undisturbed discrete input pulse signals. In these drawings, the abscissa is time, with units of nT, and the ordinate is the amplitude of the output signal $a_1(t)$ or $a_2(t)$, respectively. The input signals are provided in the form of discrete pulses $e_1(t)$ or $e_2(t)$, in accordance with FIGS. 3a and 3b. An analysis of the spectrum at the output of the data receiver shows that a rapid decay of any over-shoot always occurs, with a "roll-off" factor of $r = 0.95$.

Figure 8:
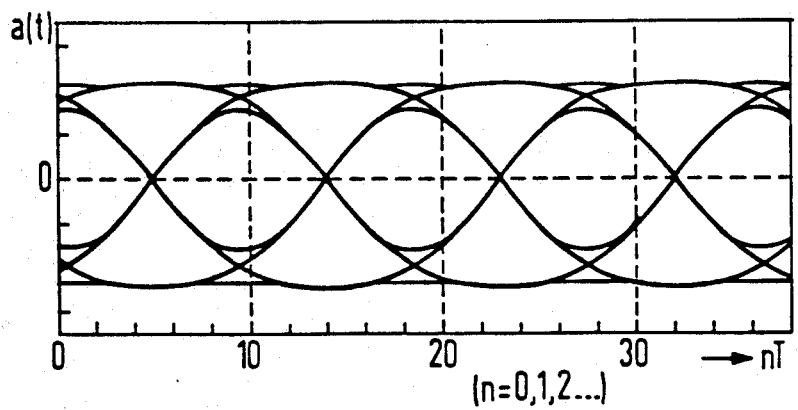
FIG. 8 is an eye diagram, relative to time for a discrete pulse sequence.

FIG. 8 shows the eye diagram of the output a(t), dependent on time in units of nT, for an undisturbed discrete pulse sequence, such as text transmission or the like. The eye diagram provides information concerning the transient behavior and the attenuation distortions of the data receiver, given an input signal comprising a discrete pulse sequence. The eye diagram is constructed such that all possible transition combinations between separating frequency and character frequency ($f_1$ and $f_2$) are contained in it. All filters employed in the data receiver are non-recursive, so that an input traverses the delay networks from input to output within a finite time. Given a data rate of 1200 Bd and a sampling frequency of 1800 Hz, a discrete pulse is exactly nine sampling times long. Therefore it suffices to generate a text of finite length showing all transition possibilities of an adequately long discrete pulse sequence. Such a text is most simply obtained with the assistance of pseudo-random, periodic binary sequences.

As shown in FIG. 8, symmetrical zero axis crossings occur and there is a large horizontal eye aperture, which facilitates recovery of the discriminator clock. The symmetry of the eye aperture with respect to the zero line assures that the zero line always forms the optimum discriminator threshold, even with fluctuating input amplitudes. As a consequence of the cut-off frequency of the low-pass filter, the ripple of the output signal is low, even during continuous tone excursions at the separating and character frequency. However, it is not possible to achieve symmetry of the output signal for continuous tone excursions simultaneously with retention of a large vertical eye aperture.

With the present invention it is possible for the demodulator to synchronize after the first zero-axis crossing of the low-pass filter output signal. That is, synchronization can be achieved after the first received character. Thus, long initial sequences, intended merely for synchronization, can be omitted, and the actual data transmission can take place with greater efficiency.

It will be apparent to others skilled in the art that various additions and modifications may be made in the apparatus of the present invention without departing from the essential features of novelty thereof, which are intended to be defined and secured by the appended claims.

What is claimed is:

1. A data receiver, having an analog-to-digital converter and means for branching digital signals at the output of the analog-to-digital converter into first and second paths, a first digital band-pass filter with a first pass band interposed in said first path, and a second digital band-pass filter with a second pass band different from said first pass band interposed in said second path, means for merging outputs from the first and second band-pass filters, first and second squaring units each respectively connected to the output of one of said band-pass filters and producing an output in accordance with the square of its input, an adder having inputs connected to the outputs of both said squaring units for producing an output corresponding to an arithmetic difference of said input signals, and a low-pass filter connected to receive the output of said adder for producing output data signals.

2. Apparatus according to claim 1, wherein said data receiver is adapted to receive transmitted data in the form of a plurality of frequencies including a separating frequency and a character frequency, said band-pass filters and said low-pass filter are designed so as to produce identical pulses at the output of said low-pass filter, with opposite signs, corresponding respectively to an input signal of one character length supplied to said band-pass filters at the separating frequency and the character frequency, said pulses each having zero axis crossings at instants corresponding to successive characters in said input signal.

3. Apparatus according to claim 1, wherein said filters are constructed as transversal filters.

* * * * *